US011862875B2

(12) United States Patent
Magill et al.

(10) Patent No.: US 11,862,875 B2
(45) Date of Patent: Jan. 2, 2024

(54) ANTENNA WITH MULTIPLE PROPAGATION MODES

(71) Applicant: THE QUEEN'S UNIVERSITY OF BELFAST, Belfast (GB)

(72) Inventors: Matthew Magill, Belfast (GB); Gareth Conway, Portadown (GB)

(73) Assignee: The Queen's University of Belfast, Belfast (GB)

( * ) Notice: Subject to any disclaimer, the term of this patent is extended or adjusted under 35 U.S.C. 154(b) by 118 days.

(21) Appl. No.: 17/250,196

(22) PCT Filed: Jun. 4, 2019

(86) PCT No.: PCT/EP2019/064516
§ 371 (c)(1),
(2) Date: Dec. 14, 2020

(87) PCT Pub. No.: WO2019/238474
PCT Pub. Date: Dec. 19, 2019

(65) Prior Publication Data

US 2021/0257738 A1 Aug. 19, 2021

(30) Foreign Application Priority Data

Jun. 13, 2018 (GB) ..................................... 1809716

(51) Int. Cl.
*H01Q 25/00* (2006.01)
*H01Q 9/04* (2006.01)

(52) U.S. Cl.
CPC ......... *H01Q 9/0421* (2013.01); *H01Q 9/0428* (2013.01); *H01Q 9/0457* (2013.01); *H01Q 25/005* (2013.01)

(58) Field of Classification Search
CPC .. H01Q 9/0421; H01Q 9/0428; H01Q 9/0457; H01Q 25/005; H01Q 9/0407; H01Q 1/273
See application file for complete search history.

(56) References Cited

U.S. PATENT DOCUMENTS

| | | | | |
|---|---|---|---|---|
| 5,801,660 A * | 9/1998 | Ohtsuka | H01Q 9/0471 343/846 |
| 2005/0057396 A1* | 3/2005 | Boyanov | H01Q 9/0407 343/700 MS |
| 2016/0322714 A1* | 11/2016 | Ying | H01Q 9/0407 |

* cited by examiner

*Primary Examiner* — Hai V Tran
*Assistant Examiner* — Michael M Bouizza
(74) *Attorney, Agent, or Firm* — Patterson Thuente IP

(57) ABSTRACT

An antenna for a body-centric wireless communication system comprises first and second radiating structures between which is located a ground plane and a feed structure. The feed structure comprises a feed line extending between the first radiating structure and the ground plane, and a slot formed in the ground plane. A pair of shorting posts connects the first radiating structure to the ground plane. The antenna is capable of simultaneously generating in-body radiation, on-body radiation and off-body radiation in the same frequency band.

19 Claims, 5 Drawing Sheets

Bottom Substrate

Feed Substrate
(Top View)

Feed Substrate
(bottom View)

Top Substrate
20
21
22
24
26
28
30
32
42
44
46
48
48A
48B
50
h1
h2
h3
w1
l1
w2
l2
d1
w3
l3
w4
l4
w5
l5
d2
d3

| DIM | *l1* | *w1* | *l2* | *w2* | | *l3* | *w3* | *l4* | *w4* | *l5* | *w5* | *d1* | *d2* | *d3* | *h1* | *h2* | *h3* | wire radius |
|---|---|---|---|---|---|---|---|---|---|---|---|---|---|---|---|---|---|---|
| VAL (mm) | 62 | 54 | 41 | 33.5 | | 39 | 1.5 | 18 | 2 | 20.8 | 20.8 | 15.6 | 16.6 | 24.6 | 3.175 | 1.28 | 3.175 | 1.2 |

Fig. 7

ANTENNA WITH MULTIPLE PROPAGATION MODES

PRIORITY CLAIM

The present application is a National Phase entry of PCT Application No. PCT/EP2019/064516, filed Jun. 4, 2019, which claims priority from United Kingdom Patent Application No. 1809716.2, filed Jun. 13, 2018, each of which is hereby fully incorporated herein by reference.

FIELD OF THE INVENTION

This invention relates to antennas. The invention relates particularly but not exclusively to wearable antennas.

BACKGROUND TO THE INVENTION

On-body wireless communication, also known as body-centric wireless communication, involves interconnection and networking of wearable computing or electronic devices, and may use the surface of the human body as a transmission medium or path for electromagnetic waves.

Designing antennas for body-centric wireless communications is challenging. This is due to the body's adverse effects on any antenna mounted in close proximity to it, namely a reduction in radiation efficiency, input impedance variation, radiation pattern fragmentation and polarization distortion, all coupled with a demand for low profile, minimum volume antenna structures. Current state-of-the-art in wireless sensing consists of sensor systems that are either too large, have high energy requirements or have insufficient performance in the challenging environment of the human body to meet the demands of emerging therapeutic and monitoring applications.

For example, in the application of remote medical sensing, conventional technology does not provide suitable wearable surface antennas that can be placed anywhere in the region of a body implant to provide a robust communication link on the human body. For a typical implant communication device, supporting all three propagation modes (off-body, on-body and in-body) would be advantageous for efficient communication. However, to achieve optimal efficient performance using conventional antenna technology, each of these propagating modes would require a different optimised antenna structure, which is undesirable in terms of cost and size.

It would be desirable to provide an antenna that mitigates the problems outlined above.

SUMMARY OF THE INVENTION

A first aspect of the invention provides an antenna comprising:

a first radiating structure;

a second radiating structure;

a ground plane located between said first and second radiating structures; and a feed structure located between said first and second radiating structures, wherein said feed structure comprises:

a feed line extending between said first radiating structure and said ground plane; and at least one slot formed in said ground plane.

The first and second radiating structures are typically spaced apart in a first, or top-to-bottom, direction, the ground plane and feed structure being located, or sandwiched, between the first and second radiating structures in said first direction.

In preferred embodiments, the antenna comprises a multi-layer structure that includes said first radiating structure and said second radiating structure spaced apart in a first direction, and wherein said ground plane is located between said first and second radiating structures in said first direction, and said feed structure is located between said first and second radiating structures in said first direction.

In preferred embodiments, said first radiating structure comprises a patch of electrically conductive material. Preferably, said second radiating structure comprises a patch of electrically conductive material.

Typically, said feed line has a free end that is located between said first and second radiating structures. The feed line typically has a second end coupled to an antenna port.

Preferably, said at least one slot overlaps with the feed line in a top-to-bottom direction of the antenna. Said at least one slot preferably overlaps with the feed line substantially at the free end of the feed line.

Preferably, said at least one slot is substantially symmetrical with respect to the feed line.

Preferably, a center of said at least one slot is aligned with the feed line in a top-to-bottom direction of the antenna. It is preferred that the centre of said at least one slot is aligned with the feed line substantially at the free end of the feed line. In preferred embodiments said at least one slot comprises a cross-shaped slot. The cross-shaped slot may have first and second crossing leg portions, each of which are obliquely disposed with respect to said feed line.

Preferably, said first radiating structure is aligned with said at least one slot in a top-to-bottom direction of the antenna, preferably such that the respective centres of the first radiating structure and said at least one slot are aligned with one another.

In preferred embodiments, said antenna further includes at least one electrically conductive connector connecting said first radiating structure to said ground plane. Preferably, said at least one connector comprises first and second connectors. Preferably a respective one of said first and second connectors is located on either side of the feed line. It is preferred that a respective one of said first and second connectors is located on either side of said at least one slot. In preferred embodiments, said first and second connectors are aligned with a centre of said at least one slot in a transverse direction that is perpendicular to the direction in which the feed line extends, and to the top-to-bottom direction of the antenna. Advantageously, said first and second connectors are equidistant from said at least one slot, preferably from a centre of said at least one slot.

Preferably, said at least one connecter is located substantially at the free end of the feed line. Advantageously, said at least one connector is substantially symmetrically arranged with respect to the feed line.

In preferred embodiments, said first radiating structure is provided on a top substrate layer, preferably on a top surface of said top substrate layer.

Preferably, said second radiating structure is provided on a bottom substrate layer, preferably on a bottom surface of said bottom substrate layer.

Preferably, said ground plane is provided on an intermediate substrate layer, preferably on a bottom surface of said first substrate layer. Advantageously, said feed line is provided on a top surface of said intermediate substrate layer.

In preferred embodiments, said at least one slot and said second radiating structure are mutually configured so that, in use, said second radiating structure generates elliptically or circularly polarised radiation. Preferably the orientation of said second radiation patch with respect to said at least one slot is selected so that, in use, said second radiating structure generates elliptically or circularly polarised radiation.

A second aspect of the invention provides a body-centric wireless communication system comprising at least one on-body node capable of wireless communication with at least one other node of the system, wherein said at least one body node comprises an antenna as claimed in any preceding claim.

Advantageously, a single antenna embodying the invention provides the functionality of three antennas (i.e. exhibits three propagation modes). This can reduce the number, complexity and/or size of wearable components of body-centric wireless system. In particular, embodiments of the invention may obviate the need for multiple single function antennas in body-centric wireless systems, or other applications where more than one propagation mode is required.

In preferred embodiments, the antenna enhances the reliability and robustness of communication between a body-surface mounted antenna and an implanted antenna, which can have an unknown location and/or orientation. This removes the specificity of surface device placement, meaning a more flexible and reliable communication link.

Further advantageous aspects of the invention will be apparent to those ordinarily skilled in the art upon review of the following description of specific embodiments and with reference to the accompanying drawings.

BRIEF DESCRIPTION OF THE DRAWINGS

Embodiments of the invention are now described by way of example and with reference to the accompanying drawings in which like numerals are used to denote like parts and in which:

FIG. 7 shows a table providing exemplary dimensions for the antenna of FIG. 2.

DETAILED DESCRIPTION OF THE DRAWINGS

Figure 1:
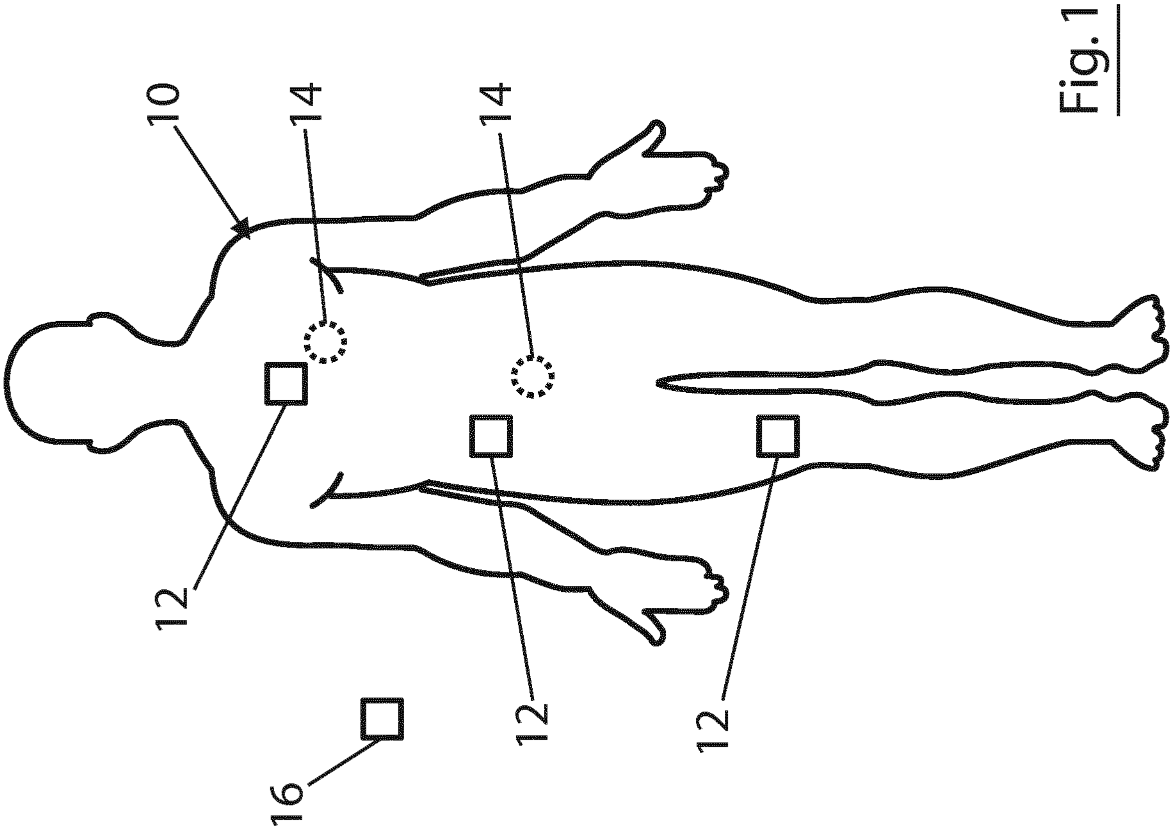
FIG. 1 is a schematic view of a body-centric wireless communication system.

FIG. 1 shows an exemplary body-centric wireless communication system, which may be referred to as a body-centric wireless network (BCWN), installed on a human body 10. The system may comprise one or more node 12 that is located on the body surface, i.e. a wearable node, one or more node 14 implanted in the body 10, and one or more node 16 located off the body 10. The nodes 12, 14, 16 comprise a computing device, or other electronic device, and are enabled for wireless communication with each other, e.g. comprising one or more antenna and any one or more of a receiver, transmitter and transceiver as applicable. The nodes 12, 14, 16 may include a controller, e.g. a suitably programmed or configured microprocessor, microcontroller or other processor, for controlling the operation of the node and performing any processing that may be required. Typically, each node 12, 14, 16 includes a power source, e.g. a battery. The on-body and off-body nodes 12, 16 are optionally equipped and configured to communication with an external communications network (not shown), for example comprising a local area network (LAN), wide area network (WAN), a telephone network and/or the internet.

Each in-body node 14 typically comprises one or more sensor for monitoring an aspect of the body 10, e.g. heart function or intestinal function. Each on-body node 12 may be configured to serve as a communications node for facilitating communication between the nodes 12, 14, 16, e.g. each on-body node 12 may act as a repeater. Each on-body node 12 optionally has one or more sensor for monitoring an aspect of the body 10, e.g. heart function, pulse or temperature.

In such body-centric wireless communication systems, or body-centric wireless networks (BCWN), three main electromagnetic radiation propagation modes can be identified depending on the relative location of the wirelessly-enabled nodes of the system: 1. communication between nodes 12 that are on the body surface (known as on-body communication); 2. communication from the body-surface node(s) 12 to nearby off-body node(s) 16 (known as off-body communication); 3. communication from the body surface node(s) 12 and node(s) 14 implanted within the body 10 (known as in-body communication).

To maintain an efficient communication link with an implanted device 14 whilst providing receiver placement flexibility, it is desirable that the body surface nodes 12 support multiple propagation modes, i.e. off-body, on-body and in-body communication. For example, when acting as a repeater, the surface node 12 may be required to receive wireless signals from one or more in-body node 14, and to transmit the received signals (or derivatives thereof) to one or more other surface node 12 and/or one or more off-body node 16. Accordingly, it is desirable that the body surface nodes 12 include an antenna 20 that supports multiple propagation modes.

In preferred embodiments, the antenna 20 supports all three propagation modes and is therefore capable of communication with in-body, on-body and off-body devices. To be practical, the antenna 20 should be suitable (e.g. in terms of size and shape) for incorporation into a wearable device wherein, when worn, the antenna 20 is close to (usually no more than 5 mm from) the surface of the body 10. In preferred embodiments, the antenna 20 is configured to operate in the Medical Body Area Network (MBAN) frequency band (2360-2400 MHz), although other frequency bands may alternatively be used. In any event, advantageously, the antenna 20 supports each of the three propagation modes in the same frequency band. It is preferred that the antenna 20 is fed by a single port 21 (which may for example comprise an SMA connector), advantageously with no physical switching (such as through the use of P/N diodes).

Considerations for the respective propagation modes are as follows:

A. In-Body Propagation Mode

A co-polar linearly polarized surface antenna may produce the best performance when directly aligned with the antenna of an in-body node 14. For in-body propagation, the antenna must have some radiation into the body and so unbalanced antennas with ground planes (e.g. microstrip patch antennas, Planar Inverted F Antennas (PIFAs) and monopole antennas) would not be suitable. A dipole or slot antenna, which have an omnidirectional radiation pattern, would be suitable. If a higher gain into the body was desired, then an inverted patch antenna (i.e. a patch antenna with its radiating patch facing in-body, and its ground plane facing off-body) would be suitable.

As antenna misalignment can have a significant detrimental effect on the performance of the in-body link, it is desirable to have a circularly polarised (CP) in-body mode. This is suited to using an inverted patch antenna as the increased into-body gain mitigates the 3 dB CP to linearly polarization attenuation. It is also relatively easy to produce CP radiation with a microstrip patch antenna using techniques such as corner truncating, slotting, amongst others.

When an on-body antenna is not aligned with the antenna of an implanted device, then an on-body antenna with radiation normal to the surface of the body is desirable. A monopole-like antenna would be a suitable radiator in this case.

B. On-Body Propagation Mode

On-body propagation occurs between two antennas mounted on the same human body 10. The antennas may be in line-of-sight (LOS) with each other, or may be located on entirely different parts of the body 10 (e.g. one on the front and one on the back of the human torso). Penetration through the human body is not a viable propagation path due to significant path losses and so propagation via creeping surface wave around the body 10 is preferred. Antennas with maximum radiation tangential to the body surface tend to provide good coupling between two body surface mounted devices. Antennas such as monopoles or printed antennas that produce monopolar radiation patterns are suited to producing radiation in the tangential direction. As this is the same radiation characteristic required for communication with a misaligned implanted antenna, a surface position flexible in-body antenna can serve as a dual-mode on-into antenna.

B. Off-Body Propagation Mode

For the off-body mode, maximum gain normal to the body's surface is desired. Accordingly microstrip patch antennas operating in their fundamental resonant mode are suitable for this mode due to their low profile nature and relatively high gain in the off-body direction. Antennas with omnidirectional radiation patterns are also suitable (such as dipole and slot antennas placed parallel to the surface of the human body).

Figure 3:
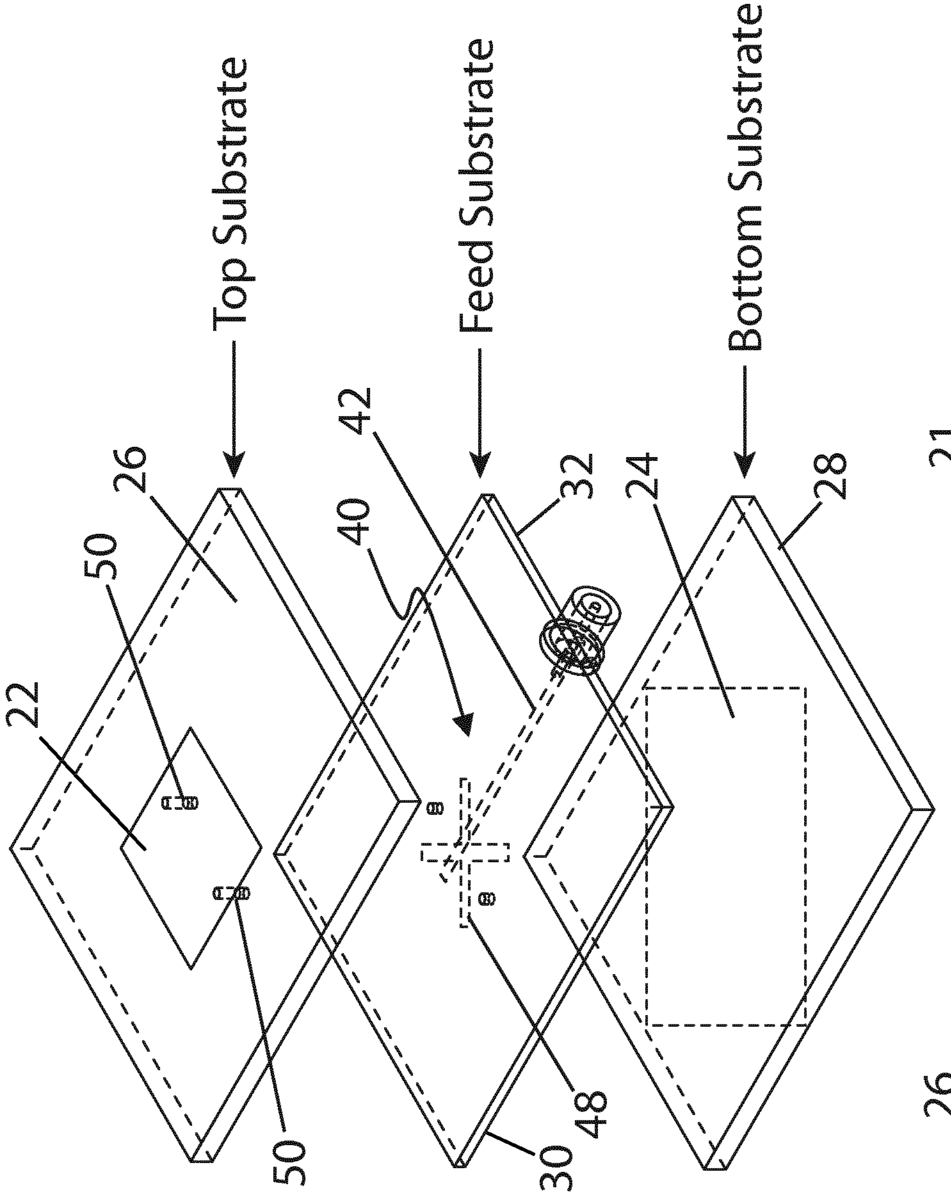
FIG. 3 is an exploded view of the antenna of FIG. 2.
Figure 4:
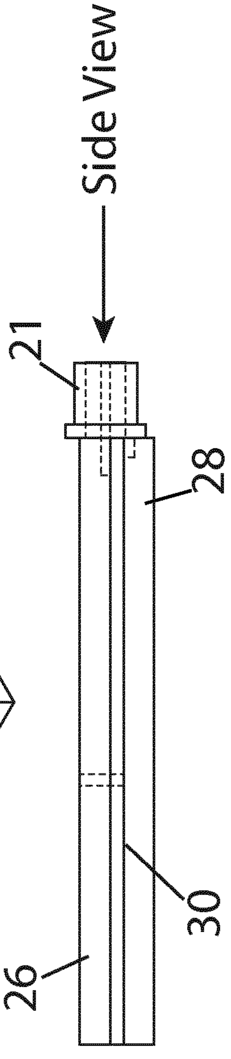
FIG. 4 is a side view of the antenna of FIG. 2.

A preferred embodiment of the antenna 20 is now described with reference to FIGS. 2 to 4. The antenna 20 comprises a first, or top, radiating structure 22 and a second, or bottom, radiating structure 24. The radiating structures 22, 24 are spaced apart from each other in a top-to-bottom direction (which may alternatively be referred to as a first direction or an axial direction) of the antenna, and are preferably substantially parallel with each other. In preferred embodiments the radiating structures 22, 24 are aligned, or substantially aligned, with each other in the top-to-bottom direction, but in any event preferably at least partially overlap with each other in the top-to-bottom direction. Each radiating structure 22, 24 may be formed from any electrically conductive material suitable for antenna radiating structures, typically metal, e.g. copper. When the antenna 20 is located on (or adjacent) the surface of the body 10, the top radiating structure 22 is intended to face away from the body 10, while the bottom radiating structure 24 faces towards the body 10.

Figure 6:
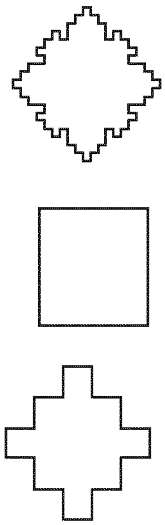
FIG. 6 provides a representation of alternative shapes for radiating elements of the antennas embodying the invention.

In preferred embodiments, the top radiating structure 22 comprises a patch radiating element. The top patch 22 may be rectangular in shape, or may take other shapes, e.g. circular or elliptical. The patch 22 may have straight edges (as shown in FIGS. 2, 2D, 3 and 6) or may have non-straight edges, for example meandered or fractal edges (as shown in FIG. 6). Conveniently, the radiating structure 22 is provided on a substrate 26 of electrically insulating material, preferably a dielectric material. Typically, the radiating structure 22 is provided as a conductive, e.g. metallic, portion on a surface, preferably a top surface, of the substrate 26. Optionally, one or more slots (not shown) may be formed in the top radiating structure 22, for example to enhance frequency selection or minimise size.

In preferred embodiments, the bottom radiating structure 24 comprises a patch radiating element. The bottom patch 24 may be rectangular in shape, or may take other shapes, e.g. circular or elliptical. The bottom patch 24 may have straight edges (as shown in FIGS. 2, 2A, 3 and 6) or may have non-straight edges, for example meandered or fractal edges (as shown in FIG. 6). Conveniently, the bottom radiating structure 24 is provided on a substrate 28 of electrically insulating material, preferably a dielectric material. Typically, the bottom radiating structure 24 is provided as a conductive, e.g. metallic, portion on a surface, preferably a bottom surface, of the substrate 28.

A ground plane 30 is located between the top and bottom radiating structures 22, 24. The ground plane 30 is preferably substantially parallel with the top and bottom feed structures 22, 24. The ground plane 30 is spaced apart from each radiating structure 22, 24 in the top-to-bottom direction. In preferred embodiments, the ground plane 30 is located between the top and bottom radiating structures 22, 24 in the top-to-bottom direction, i.e. sandwiched between the structures 22, 24. As such the feed line 42 and the radiating structures 22, 24 at least partially overlap in the top to bottom direction. The ground plane may be formed from any electrically conductive material suitable for forming antenna ground planes, typically metal, e.g. copper. The ground plane 30 may be connected to electrical ground in any convenient manner.

The ground plane 30 serves as a ground plane to both the top and bottom radiating structures 22, 24. When the antenna 20 is located on (or adjacent) the surface of the body 10, the ground plane 30 does not inhibit propagation of radiation into the body 10 from the bottom radiating structure 24 (because the bottom radiating structure 24 is located between the body 10 and the ground plane 30), and does not inhibit off-body or on-body propagation of radiation from the top radiating structure 22 (because the ground plane 30 is located below the top radiating structure 22). Conveniently, the ground plane 30 is provided on a substrate 32 of electrically insulating material, preferably a dielectric material. Typically, the ground plane 30 is provided as a conductive, e.g. metallic, layer on a surface, preferably a bottom surface, of the substrate 32.

The antenna 20 comprises a feed structure 40 located between the top and bottom radiating structures 22, 24. The feed structure 40 is coupled to the port 21. In a transmitting mode of the antenna 20, the feed structure 40 receives excitation signals from circuitry such as a transceiver (not shown in FIGS. 2 to 4) via the port 21, and feeds the excitation signals to the top and bottom radiating structures 22, 24 for transmission thereby. In a receiving mode of the antenna 20, the feed structure 40 feeds received signals from the top and bottom radiating structures 22, 24 to the external circuitry via port 21.

The feed structure 40 comprises a feed line 42, typically in the form of a microstrip feed line. The feed line 42 may be formed from any electrically conductive material, typically metal, e.g. copper. The feed line 42 extends between, and preferably substantially parallel with, the top and bottom radiating structures 22, 24. In particular, the feed line 42 is located between the top and bottom radiating structures 22, 24 in the top-to-bottom direction, i.e. sandwiched between the structures 22, 24. As such the feed line 42 and the radiating structures 22, 24 at least partially overlap in the top to bottom direction. The feed line 42 is spaced apart from each radiating structure 22, 24 in the top-to-bottom direction. The feed line 42 is spaced apart from the ground plane 30 in the top-to-bottom direction. The feed line 42 has a first, or free, end 46 located between the top and bottom radiating structures 22, 24, and a second end 44 (which may be referred to as the feed end) coupled to the port 21 (in use). In particular, the end 46 of feed line 42 is located between the top and bottom radiating structures 22, 24 in the top-to-bottom direction, i.e. sandwiched between the structures 22, 24. In preferred embodiments, the feed line 42 is located between the ground plane 30 and the top radiating structure 22 (in the top-to-bottom direction). Hence, the feed line advantageously faces off-body relative to the ground plane 30 to reduce body coupling losses.

The feed structure 40 further includes at least one slot 48, or through-aperture, formed in the ground plane 30. In preferred embodiments, there is only one slot 48, although additional slot(s) may be provided in other embodiments. In preferred embodiments, the, or each, slot 48 is located between the top and bottom radiating structures 22, 24 in the top-to-bottom direction, i.e. sandwiched between the structures 22, 24. The slot 48 preferably overlaps with the feed line 42 in the top-to-bottom direction of the antenna 20. In particular it is preferred that the slot 48 overlaps with the feed line 42 substantially at (i.e. at or adjacent) the second end 46 of the feed line 42. The slot 48 is preferably symmetrical or substantially symmetrical with respect to the feed line 42 when viewed in the top-to-bottom direction of the antenna 20. It is preferred that the centre of the slot 48 is aligned with the feed line 42 in the top-to-bottom direction of the antenna 20. In particular, it is preferred that the centre of the slot 48 is aligned with the feed line 42 substantially at the first end 46 of the feed line 42. The slot 48 typically has straight edges, but may have non-straight edges, for example meandered or fractal edges.

In preferred embodiments, the slot 48 is substantially X-shaped or cross-shaped, having first and second crossing leg portions 48A, 48B. The leg portions 48A, 48B preferably cross each other perpendicularly, but may alternatively cross each other obliquely. The leg portions 48A, 48B are preferably of the same length, but may alternatively be of different lengths. The leg portions 48A, 48B are preferably of the same width, but may alternatively be of different widths. The leg portions 48A, 48B are preferably straight, but one or both may alternatively be curved. Preferably, the slot 48 is oriented such that neither of the legs 48A, 48B extends parallelly with the feed line 42, i.e. each of the leg portions 48A, 48B extends obliquely with respect to the feed line 42. In preferred embodiments, the cross-shaped slot 48 is aligned with the feed line 42, preferably substantially at the first end 46, in the top-to-bottom direction of the antenna 20 and is symmetrical or substantially symmetrical about the feed line 42. In preferred embodiments, the substantially cross-shaped slot 48 is a single slot. In alternative embodiments, there may be more than one slot. For example two V-shaped slots may be arranged to form a substantially cross-shaped composite slot, or four substantially linear slots may be arranged to form a substantially cross-shaped slot.

In preferred embodiments, the top radiating structure 22 is aligned with the slot 48 in the top-to-bottom direction of the antenna 20, preferably such that the respective centres of the structure 22 and slot 48 are aligned with one another in the top-to-bottom direction. Preferably the bottom radiating structure 24 is aligned with the slot 48 in the top-to-bottom direction of the antenna 20, preferably such that the respective centres of the structure 24 and slot 48 are aligned with one another in the top-to-bottom direction.

Typically, the feed structure 40 is provided on a substrate of electrically insulating material, preferably a dielectric material. Typically, the feed line 42 is provided as a conductive, e.g. metallic, strip on a surface of the substrate. Conveniently, the feed line 42 is provided on the same substrate 32 as the ground plane 30, on the opposite surface to the ground plane 30 (i.e. the feed line is formed in the top surface of substrate 32 in the illustrated embodiment). Hence, the feed line 42 and the slot(s) 48 are provided on opposite faces of the same substrate 32.

In preferred embodiments, the antenna 20 includes at least one, and typically a plurality of, electrically conductive connectors 50 connecting the top radiating structure 22 to the ground plane 30. The connectors 50 create an electrical connection between the structure 22 and ground plane 30. The connectors 50 short the top radiating structure 22 to the ground plane 30 and may be referred to as shorting posts. In preferred embodiments, the antenna 20 includes first and second shorting posts 50, a respective one located on either side of the feed line 42. The posts 50 are preferably located substantially at the first end 46 of the feed line 42. The posts 50 are preferably symmetrical or substantially symmetrically arranged with respect to the feed line 42. In preferred embodiments, a respective post 50 is located on either side of the slot 48. Preferably, the posts 50 are aligned with the centre of the slot 48 in a transverse direction that is perpendicular to the direction in which the feed line 42 extends, and to the top-to-bottom direction of the antenna 20. Preferably, the posts are equidistant from the slot 48, in particular from the centre of the slot 48. In preferred embodiments, two connectors 50 are provided, preferably in the manner illustrated, although in other embodiments a single connector 50 may be provided, or more than two connectors 50. The, or each connector 50 does not have to be in the form of a post (or pin), and may for example take any other convenient form, e.g. an elongate strip or wall of conductive material, which may run parallel with the ground plane 30. In some embodiments, in particular embodiments where the on-body propagation mode is not required, the connectors 50 can be omitted.

The preferred antenna 20 comprises a multi-layer structure, with the top layer of the structure typically comprising the top radiating structure 22, the bottom layer typically comprising the bottom radiating structure 24, and the ground plane 30 and feed structure 40 being provided in intermediate layers between the top and bottom layers. Preferably the layers are supported by the substrates 26, 28, 32, which are stacked such that the substrate 26 provides a top substrate layer, the substrate 28 provides a bottom substrate layer and the substrate 32 provides an intermediate substrate layer between the top and bottom substrate layers. In alternative embodiments (not illustrated) the respective components of the layers may be supported by any other suitable support structure(s), not necessarily substrates. In such embodiments, the respective components of the layers may be separated by a respective air gap rather than a layer of dielectric material.

In preferred embodiments, the substrates 26, 28, 32 form a body of the antenna 20, and are preferably uniform in size. The substrates 26, 28, 32 are preferably rectangular in shape, but may alternatively take other shapes. The port 21 and second end 44 of the feed line 42 may be located at an edge of the body formed by the substrates. More generally, the port 21 and second end 44 of the feed line 42 may be located at an edge boundary of the antenna 20. In preferred embodiments, the posts 50 extend through apertures formed in the substrates 26, 32.

Figures 2, 2A, 2B, 2C, 2D:
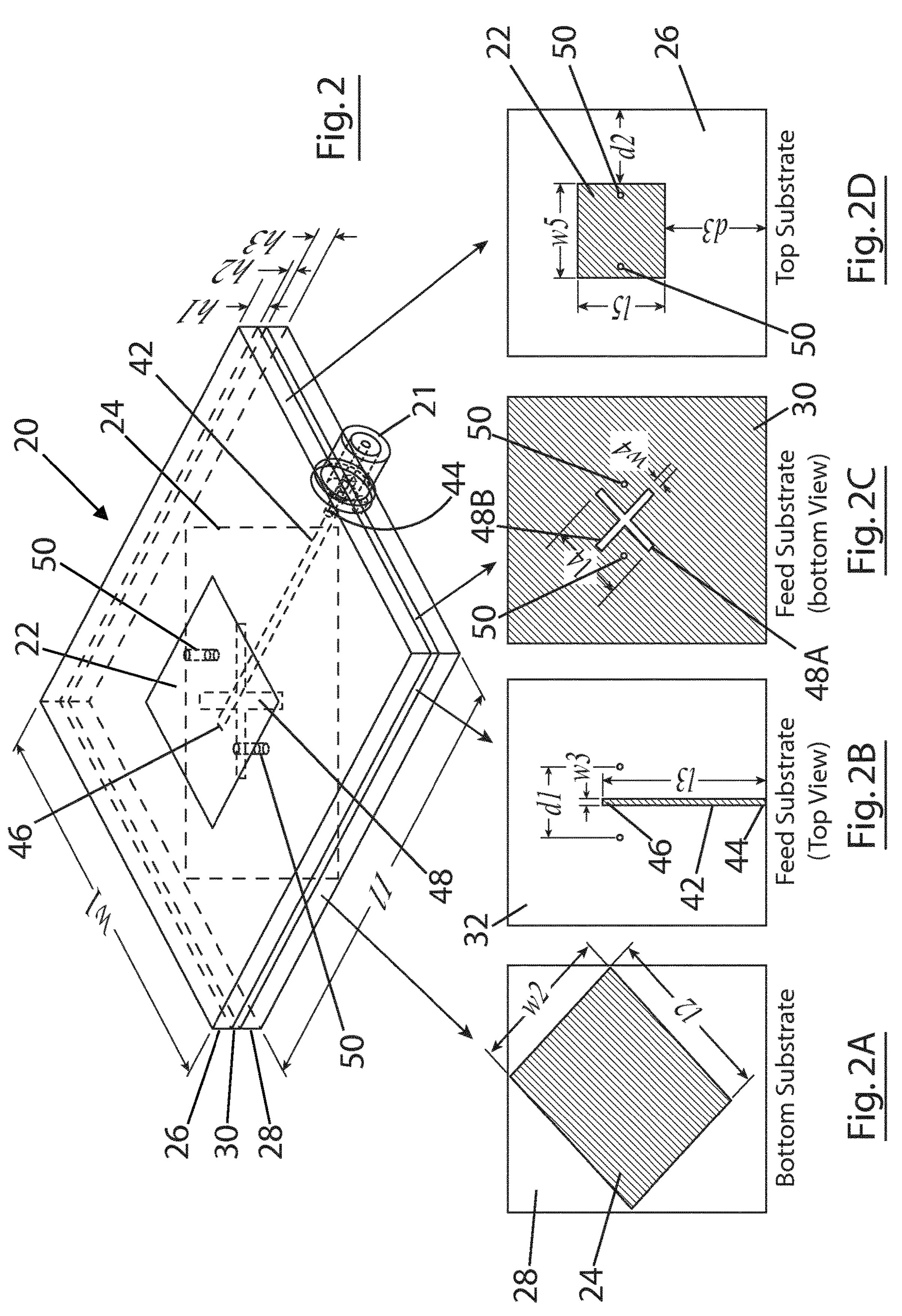
FIG. 2 is a perspective view of an antenna embodying the invention.
FIG. 2A is a bottom view of a bottom substrate of the antenna of FIG. 2.
FIG. 2B is a top view of a feed substrate of the antenna of FIG. 2.
FIG. 2C is a bottom view of the feed substrate of FIG. 2B.
FIG. 2D is a top view of a top substrate of FIG. 2.

FIG. 7 shows a table giving exemplary dimensions for the antenna 20 shown in FIG. 2. These dimensions are suitable for providing the three propagation modes in the 2.38 GHz MBAN band. It will be understood that any one or more of the given dimensions may be altered to suit any given application and/or for any desired optimization purposes.

Advantageously, the antenna 20 is capable of generating all three propagation modes from a single feed structure 42 at the same frequency. In preferred embodiments, the feed line 42 feeds the bottom patch 24 through the slot 48 to induce orthogonal modes in the bottom patch 24, producing CP radiation into the body 10. The feed line 42 also proximity feeds the top patch 22 to produce the off-body and on-body propagation modes. The top patch 22 generates a monopolar radiation pattern and so produces the desired on-body radiation mode with an electric (E) field orientated normal to the surface of the patch 22 (and therefore to the surface of the body 10 when the antenna is worn). Hence the feed structure 42 indirectly feeds both the top and bottom radiating structures 22, 24 (via proximity electromagnetic coupling and the slot 48 respectively) simultaneously. The dual indirect feed structure allows the two separate radiating structures 22, 24 to be optimized almost independently of each other, all while using the same ground plane 30.

In use, electromagnetic fields extend between the feed line 42 and the slotted ground plane 30. The fields couple through the slot 48 with the bottom patch 24, and with the top patch 22 by proximity electromagnetic coupling. The width and/or length of the feed line 42 may be selected to transform the impedance of the antenna 20 to that of the signal source (typically a transmitter or receiver RF front end—not shown). In typical applications the feed line 42 is configured to provide a 50 ohm impedance. However, the length and width of the feed line 42 can be optimised to suit different source impedances as required.

In use, the non-metallized region(s) provided by the slot 48 radiate and couple with other layer(s), in particular the bottom patch 22, while still allowing a ground plane to be provided.

Advantageously, the slotted ground plane 30 provides multiple functions: the ground metallisation isolates the tissue loading effect of the body 10 (i.e. of the person or other mobile platform) from the propagation modes provided by the top radiating structure 22; and the non-metalized slot 48 allows excitation of the bottom radiating structure 24 by the feed line 42. The size, including the length and/or width, or the slot 48 or slot portions may be adjusted to control impedance and the amount of coupling to the bottom patch 22, which in turn affects the extent of the into-body propagation mode.

The shorting posts 50 connect the top radiating structure 22 to the ground plane 30 to facilitate production of the on-body propagation mode. The posts 50 create null regions in the electromagnetic fields between the feed structure 42 and the upper radiating structure 22, which facilitates the on-body mode. The posts 50 may have any cross-section shape, e.g. circular or rectangular, and their size (width and/or length) may be adjusted to suit the application and/or the optimization of the antenna 20.

The radiation pattern of any radiating structure with "monopolar" radiation has a characteristic null normal to its ground plane, which in the case of the proximity-fed shorted patch 22, 122 is in the off-body direction. To produce radiation in this direction, the size of the slot(s) 48 through which the bottom patch 24, 124 is aperture-fed (or slot-fed) may be selected to produce parasitic (but in this case desired) radiation in the off-body direction.

In use, the bottom radiating structure 22 provides the in-body propagation mode. For some applications, including BCWN applications, it is desirable to generate elliptically or circularly polarised in-body radiation. This may be achieved via the orientation of the bottom radiating structure 22 with respect to the feed line 42 and/or the slot 48. For example, in preferred embodiments in which the bottom radiating patch 24 is rectangular, the patch 24 may be orientated such that the edges of the patch 24 are oblique with respect to the feed line 42. Alternatively or in addition, the patch 24 may be orientated such that the edges of the patch 24 are parallel or perpendicular, as applicable, with the leg portions of the slot 48. An oblique orientation of the radiating structure 24 supports elliptical or circular polarising currents in the structure 24. In such embodiments, the bottom patch 24 may be oriented with respect to the top patch 22 such that their respective edges run obliquely with respect to one another. In preferred embodiments, the radiation emitted from the bottom radiating element 24 balances the amount of radiation emitted by the top radiating element 22, i.e. the in-body propagation mode is balanced with the off- and on-body modes. More generally, circular polarisation is an optimisation between the slot 48 and the bottom radiating patch 24. Achieving circular polarisation may involve adjusting the length of the slot arms and orientation of the patch 24 to cause current to circulate on the radiating element. Optionally, this can be achieved with variations in shape of the radiating patch 24.

Causing the antenna 20 to emit elliptically or circularly polarised radiation in the in-body mode means that the antenna 20, when mounted on the body 10, is significantly less sensitive to the orientation (field polarisation) of the implanted device 14 with which it communicates, and so makes the placement of the antenna 20 with respect to the implanted device 14 less critical for operation of the system.

In alternative embodiments, elliptical or circular polarisation of the radiation of the in-body mode is not required. For example, linear polarization of radiation of the in-body mode may be achieved by aligning the bottom radiating structure 24 with the feed line 42, e.g. such that the edges of the structure 24 are parallel or perpendicular, as applicable, with the feed line 42 in the case of a rectangular patch 24. Parameters of the bottom radiating structure 24 (e.g. its shape and/or dimensions) can be optimised or otherwise varied to increase or reduce the magnitude of the field into the body 10.

Figure 5:
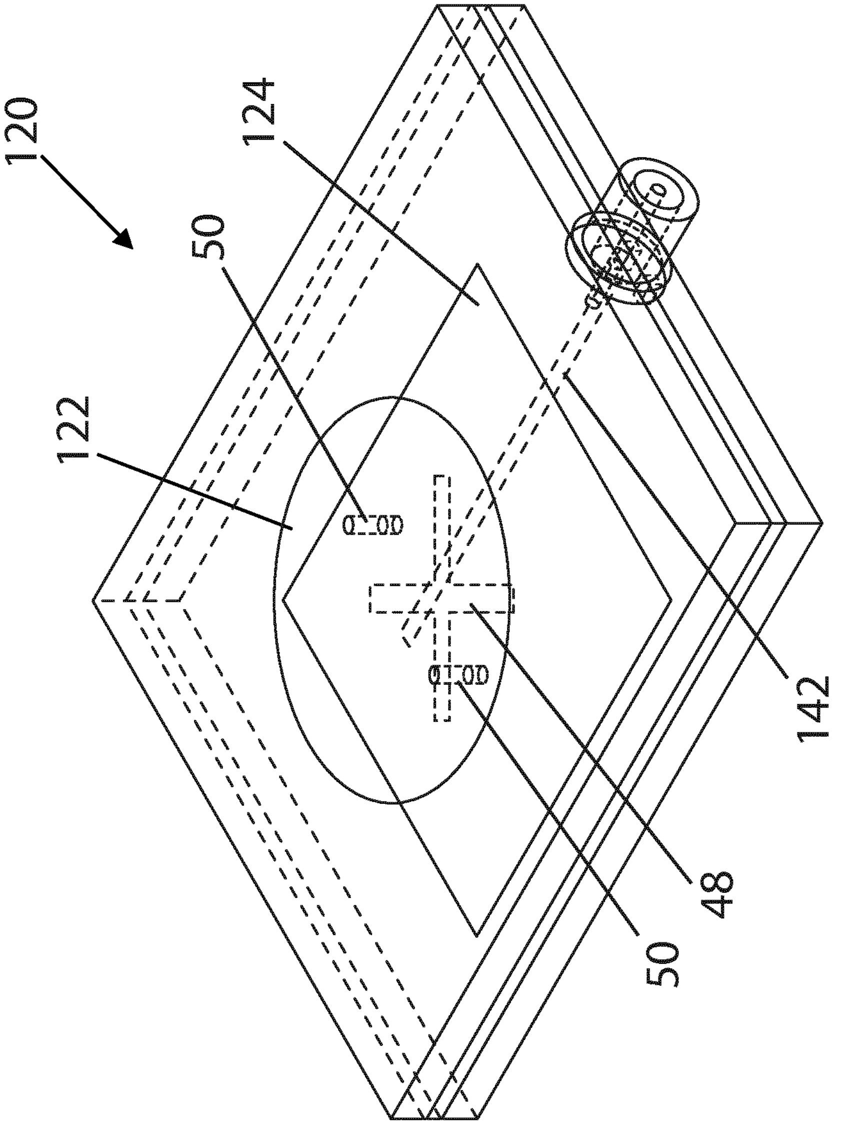
FIG. 5 is a perspective view of an alternative antenna embodying the invention.

FIG. 5 illustrates an alternative embodiment of the antenna, indicated as 120, in which like numerals are used to denote like parts and in respect of which the same, or similar, description applies as provided in relation to the antenna 20. The antenna 120 shows some of the variations described above. In particular, the top radiating patch 122 is circular and the bottom patch 124 is aligned with the feed line 142. The antenna 120 produces linearly polarised in-body radiation.

It will be apparent that antennas 20, 120 embodying the invention are suitable for use in an on-body node 12 of a BCWN system, the antenna 20, 120, when worn, being oriented such that the bottom radiating structure 24, 124 faces the body 10, and the top radiating structure 22, 122 faces away from the body 10. As well as being able to communicate with on-body and off-body nodes 12, 16, the antennas 20, 120 are capable of reliable communication with the antenna of an implanted device 14 in an unknown location and/or orientation, thus allowing flexibility in the placement of the body surface node 12 to maximize user comfort and/or reduce power consumption.

In preferred embodiments, the antenna 20, 120 comprises a single, physically compact wearable antenna structure. The single antenna structure may adapt to all the medical propagation requirements and the diverse physiological and morphological parameters of a human host. The preferred single antenna has the function of three antennas, meaning one wearable component as opposed to up to three, leading to less complexity and reduced physical size.

The antenna 20, 120 may be part of a repeater device. As such, any data obtained from an implant device 14 may be transmitted to another node 12, 16 either on-body or off-body.

The invention is not limited to the embodiment(s) described herein but can be amended or modified without departing from the scope of the present invention.

The invention claimed is:

1. An antenna comprising:

a first radiating structure;

a second radiating structure;

a single ground plane located between said first and second radiating structures; and a feed structure located between said first and second radiating structures, wherein said feed structure comprises:

a feed line located between said first radiating structure and said single ground plane; and at least one slot formed in said single ground plane, and wherein said antenna further includes:

a first electrically conductive connector extending between said first radiating structure and said single ground plane and connecting said first radiating structure to said single ground plane; and a second electrically conductive connector extending between said first radiating structure and said ground plane and connecting said first radiating structure to said single ground plane, wherein said first electrically conductive connector is connected to said single ground plane at a first side of said at least one slot, and said second electrically conductive connector is connected to said single ground plane at a second side of said at least one slot, wherein said at least one slot is at least partly located between said first and second electrical connectors.

2. The antenna of claim 1, wherein the first and second radiating structures are spaced apart in a first, or top-to-bottom, direction, the ground plane and feed lines being located, or sandwiched, between the first and second radiating structures in said first, or top-to-bottom, direction.

3. The antenna of claim 1, wherein said first radiating structure comprises a patch of electrically conductive material, and wherein, preferably, said second radiating structure comprises a patch of electrically conductive material.

4. The antenna of claim 1, wherein said feed line has a free end that is located between said first and second radiating structures, and a second end that may be coupled to an antenna port.

5. The antenna of claim 1, wherein said at least one slot overlaps with the feed line in a top-to-bottom direction of the antenna, and wherein, preferably, said feed line has a free end that is located between said first and second radiating structures, and wherein said at least one slot overlaps with the feed line substantially at the free end of the feed line.

6. The antenna of claim 1, wherein said at least one slot is substantially symmetrical with respect to the feed line.

7. The antenna of claim 1, wherein a centre of said at least one slot is aligned with the feed line in a top-to-bottom direction of the antenna, and wherein, preferably, said feed line has a free end that is located between said first and second radiating structures, and wherein the center of said at least one slot is aligned with the feed line substantially at the free end of the feed line.

8. The antenna of claim 1, wherein said at least one slot comprises a cross-shaped slot, wherein, preferably, said cross-shaped slot has first and second crossing leg portions, each of which are obliquely disposed with respect to said feed line.

9. The antenna of claim 1, wherein said first radiating structure is aligned with said at least one slot in a top-to-bottom direction of the antenna, preferably such that the respective centres of the first radiating structure and said at least one slot are aligned with one another.

10. The antenna of claim 1, wherein said at least one connector is substantially symmetrically arranged with respect to the feed line, and/or located substantially at a free end of the feed line.

11. The antenna of claim 1, wherein said first and second connectors are aligned with a centre of said at least one slot in a transverse direction that is perpendicular to the direction in which the feed line extends, and to the top-to-bottom direction of the antenna, and wherein said first and second connectors are equidistant from said at least one slot, preferably from a center of said at least one slot.

12. The antenna of claim 1, comprising a multi-layer structure including said first radiating structure and said second radiating structure spaced apart in a first direction, and wherein said ground plane is located between said first and second radiating structures in said first direction, and said feed structure is located between said first and second radiating structures in said first direction.

13. The antenna of claim 12, wherein said first radiating structure is provided on a top substrate layer, preferably on a top surface of said top substrate layer.

14. The antenna of claim 12, wherein said second radiating structure is provided on a bottom substrate layer, preferably on a bottom surface of said bottom substrate layer.

15. The antenna of claim 12, wherein said ground plane is provided on an intermediate substrate layer, preferably on a bottom surface of said first substrate layer, and wherein said feed line is preferably provided on a top surface of said intermediate substrate layer.

16. The antenna of claim 1, wherein said at least one slot and said second radiating structure are mutually configured to cause said second radiating structure to generate elliptically or circularly polarised radiation, and wherein, preferably, an orientation of said second radiation patch with respect to said at least one slot is selected to cause said second radiating structure to generate elliptically or circularly polarised radiation.

17. A body-centric wireless communication system comprising at least one on-body node capable of wireless communication with at least one other node of the system, wherein said at least one body node comprises an antenna as claimed in claim 1.

18. The antenna of claim 1, wherein said at least one electrically conductive connector comprises at least two electrically conductive connectors arranged symmetrically with respect to said at least one slot.

19. An antenna comprising:

a first radiating structure;

a second radiating structure;

a single ground plane, said single ground plane being located between said first and second radiating structures and being the only ground plane located between said first and second radiating structures; and a feed structure located between said first and second radiating structures, wherein said feed structure comprises:

a feed line located between said first radiating structure and said single ground plane; and at least one slot formed in said single ground plane, and wherein said antenna further includes:

a first electrically conductive connector extending between said first radiating structure and said single ground plane and connecting said first radiating structure to said single ground plane; and a second electrically conductive connector extending between said first radiating structure and said ground plane and connecting said first radiating structure to said single ground plane, wherein said first electrically conductive connector is connected to said single ground plane at a first side of said at least one slot, and said second electrically conductive connector is connected to said single ground plane at a second side of said at least one slot, wherein said at least one slot is at least partly located between said first and second electrical connectors.

* * * * *